(12) United States Patent
Chen et al.

(10) Patent No.: US 10,158,114 B2
(45) Date of Patent: Dec. 18, 2018

(54) ONE-SIDED ULTRASONIC BONDING FOR APPLICATIONS TO JOIN BATTERY TABS TO BUS BARS

(71) Applicant: GM Global Technology Operations LLC, Detroit, MI (US)

(72) Inventors: Chih-Chang Chen, Rochester Hills, MI (US); Michael J. Bland, Clarkston, MI (US)

(73) Assignee: GM Global Technology Operations LLC, Detroit, MI (US)

(*) Notice: Subject to any disclaimer, the term of this patent is extended or adjusted under 35 U.S.C. 154(b) by 105 days.

(21) Appl. No.: 14/932,236

(22) Filed: Nov. 4, 2015

(65) Prior Publication Data

US 2017/0125775 A1    May 4, 2017

(51) Int. Cl.
| | |
|---|---|
| *B23K 20/10* | (2006.01) |
| *H01M 2/20* | (2006.01) |
| *H01M 2/10* | (2006.01) |
| *B23K 20/233* | (2006.01) |
| *B23K 101/36* | (2006.01) |
| *B23K 103/10* | (2006.01) |
| *B23K 103/12* | (2006.01) |

(52) U.S. Cl.
CPC ............ *H01M 2/206* (2013.01); *B23K 20/10* (2013.01); *B23K 20/233* (2013.01); *B23K 20/2336* (2013.01); *H01M 2/1077* (2013.01); *B23K 2101/36* (2018.08); *B23K 2103/10* (2018.08); *B23K 2103/12* (2018.08); *H01M 2220/20* (2013.01)

(58) Field of Classification Search
CPC ..... H01M 2/202; B23K 20/10; B23K 20/106; B23K 11/11; B23K 2201/36; B23K 26/21; B23K 26/22
USPC ........ 228/1.1, 110.1, 111, 101, 102, 103, 901
See application file for complete search history.

(56) References Cited

U.S. PATENT DOCUMENTS

2011/0108181 A1* 5/2011 Cai .................. B23K 20/10
                                                              156/64
2013/0306216 A1* 11/2013 Cai .................. B23K 20/10
                                                              156/64

* cited by examiner

*Primary Examiner* — Erin B Saad
(74) *Attorney, Agent, or Firm* — Quinn IP Law

(57) ABSTRACT

A method of ultrasonically bonding a plurality of prismatic battery cell tabs to a bus bar within a battery section. The method includes arranging numerous prismatic battery cells such that cell tabs that extend from their lateral edge are substantially aligned along a stacking dimension defined within the battery section, and positioning a free end of at least one of the plurality of cell tabs in contact with a surface of the bus bar. The method is completed by contacting a bonding tool to no more than one surface of the positioned cell tab free end and ultrasonically bonding the positioned cell tab free end to a bus bar with the bonding tool. The one-sided bonding tool has a bonding tip cooperative with an ultrasonic excitation source.

19 Claims, 4 Drawing Sheets

ONE-SIDED ULTRASONIC BONDING FOR APPLICATIONS TO JOIN BATTERY TABS TO BUS BARS

GOVERNMENT PROGRAM

This invention was made with U.S. Government support under Contract/Project Name GEN II & Volt Program. The U.S. Government may have certain rights in this invention.

BACKGROUND OF THE INVENTION

This invention relates generally to a joining strategy for batteries, and more particularly to one-sided ultrasonic bonding of battery tabs and bus bars that are used for vehicular and related transportation applications such that high power, two-sided welding methods are avoided.

Lithium-ion and related batteries are being used in automotive and related transportation applications as a way to supplement, in the case of hybrid electric vehicles (HEVs), or supplant, in the case of purely electric vehicles (EVs), conventional internal combustion engines (ICEs). The ability to passively store energy from stationary and portable sources, as well as from recaptured kinetic energy provided by the vehicle and its components, makes such batteries ideal to serve as part of a propulsion system for cars, trucks, buses, motorcycles and related vehicular platforms. The flow of electric current to and from the individual cells (i.e., a single electrochemical unit) is such that when several such cells are combined into successively larger assemblies (such as modules and packs), the current or voltage can be increased to generate the desired power output. In the present context, larger module and pack assemblies are made up of one or more cells joined in series (for increased voltage), parallel (for increased current) or both, and may include additional structure to ensure proper installation and operation of these cells. One common vehicular form of the battery pack is known as a power battery, while another is known as an energy battery.

In one form, the individual cells that make up a battery pack are configured as rectangular (i.e., prismatic) cans that define a rigid outer housing known as a cell case. These types of cells are generally assembled into the power battery pack variant. In another form, the individual cells are housed in thinner, flexible rectangular pouches that are generally assembled into the energy battery pack variant. Both cell types can be placed in a facing arrangement (much like a deck of cards) along a stacking axis formed by the aligned parallel plate-like surfaces. Positive and negative terminals situated on one edge on the exterior of the housing of each cell are laterally-spaced from one another to act as electrical contacts for connection (via bus bar, for example) to an outside load or circuit. With particular regard to the prismatic pouch, the battery cells may incorporate thin metal sheets as electrode substrates, or simply electrode sheets, to generate the flow of electric current. These electrode sheets incorporate an extension, i.e., tab, which extends outside of the cell pouch and is used to join the electrode sheet to conductors or bus bars made of copper metal or metal alloy or aluminum metal or metal alloy during battery assembly. Two types of tab materials are commonly used in battery construction: aluminum and copper. In some cases, the copper tabs and/or copper conductor may be coated with a thin layer of nickel to enhance corrosion resistance. In some cases, the aluminum tabs and/or aluminum conductor may have a thin anodization layer.

Joining the thin tab materials to the much thicker conductor has been difficult for a number of reasons. First, the stack-ups require the joining of several separate pieces of metal in one operation, e.g., multiple separate tabs to one conductor. Second, the stack-ups can include a dissimilar metal combination that is known to be difficult due to the formation of brittle intermetallics, e.g., copper and aluminum. Third, the thickness ratio between the conductor and battery cell tabs can be high, for example at least about 4:1 or more.

Ultrasonic metal welding has been used for this application with some success. It enables the joining of dissimilar metals and is capable of joining materials with significant differences in sheet thickness. However, due to the high force necessary for ultrasonic metal welding, a backstop is used to allow for proper joining of the members. This requires access to both sides of the battery tabs and the bus bars, which severely limits the ability to design more compact battery assemblies. Another shortcoming of a welded joint is that the joint cannot be easily taken apart nondestructively for replacement or service.

Mechanical fasteners have also been used. Mechanical fasteners, such as screws or clamps, provide a reversible joint. They rely on very low contact resistance to achieve good electrical conductivity. However, contact resistance can degrade over time through buildup of surface contaminants (e.g., oxides), or degradation of the fastener. Furthermore, screws or clamps incur significant mass, cost, and assembly time.

Soldered joints can also be used. However, the use of solders with fluxing agents, particularly for aluminum, can result in the formation of corrosive flux residue that will degrade the surrounding materials or joint over time if not removed by cleaning operations. These operations add cost and, in some cases, may not be possible depending on the assembly sequence.

Laser welding is another process that has seen use more recently. This process allows for strong, consistent welds within small areas. The major disadvantage of laser welding is the use of fusion which does not work well for dissimilar metal welding without bi-metal bus bars. Also, the high monetary cost, which can be prohibitive if only small quantities are needed.

Due to its limited power capacity, wire and ribbon bonding have traditionally been used primarily in low electrical load applications, such as semiconductor packaging. While being used by certain battery manufacturers, this method is not commonly used for joining battery tabs to bus bars in automotive battery manufacture. While ribbon bonding does not require the high forces of ultrasonic metal welding and is less expensive than laser welding, its own limitations are present. The process uses a bonding ribbon or wire to join the structural elements, which is less effective in the present application. It would also be very difficult to bond the bus bar and cell tabs across an edge, and the extra layer of material would drastically reduce the effectiveness of the weld.

There remains a need for a process for joining battery cell tabs to conductors or bus bars.

SUMMARY OF THE INVENTION

According to one aspect of the present invention, a method of ultrasonically joining a group of prismatic battery cells to a bus bar within a battery section is provided. The process to bond the parts includes assembling the numerous prismatic battery cells such that the cell tabs that exit from them are substantially aligned along a plane defined within the battery section. In addition, the method includes positioning a free end of one or more cell tabs in contact with a face of the conductor and placing a bonding tool to only one surface of the cell tab free end and the conductor which are positioned against each other. Finally, the method requires ultrasonically bonding the positioned cell tab free end and the bus bar with the bonding tool.

According to another aspect of the present invention, a method of joining several prismatic battery cells within a battery pack section is provided. The method comprises positioning the group of cell tabs that establish an electrical connection with battery cells so the cell tabs are substantially positioned along an axis within the battery section. The process further includes situating the cell tabs so at least one is in contact with a surface of a conductor and providing a bonding tool for single-sided operation, the tool having a bonding end combined with a device having an ultrasonic force generator. The method also includes placing the bonding tip of the bonding tool on to only one surface of the cell tab, and then affecting the ultrasonic frequency to the cell tabs and conductor with the tip of the tool to form an ultrasonic bond between the conductor and the cell tabs.

DESCRIPTION OF THE INVENTION

The invention is a method of joining multiple sheet layers fabricated from aluminum, copper, or other similar materials. The method provides improved electrical contact and strength using ultrasonic vibrations without the need for a solder or a backstop to join the thin sheet battery tabs and heavy gauge conductor, or bus bar, together. Once the tabs and conductor are located correctly, a bonding tool is brought into contact with the stack-up of cell tabs. Preferably, the bonding tool is mechanically connected to an ultrasonic transducer, e.g., sonotrode. The ultrasonic transducer produces the ultrasonic vibrations, enabling the bonding process. Contact between the bonding tool and stack-up causes an ultrasonic bond to be created, joining the battery tabs and conductor.

The bonding tool coupled to the cell tab free end and the conductor introduces vibrations into the stack-up of the plurality of cell tabs and bus bar that disrupt surface oxides on the cell tabs and bus bar. This facilitates the formation of intimate metallurgical contact between all layers. The elimination of the need for filler or bonding material, such as solder, simplifies the process. An implement can be utilized to apply pressure to the same surface as the bonding tool, to ensure that the assembly does not move during the welding process.

The use of the light force, micro-joining nature of present bonding process produces miniature bonds between battery cell tabs and bus bars in a single-sided configuration. The miniature bonds can then be populated to achieve the desired overall joint strength. Unlike wire or ribbon bonding which feeds wire or ribbon below the bonding tool, this invention applied the bonding tool directly to the cell tabs to form a miniature bond. The elimination of the need for a backstop allows for more compact designs and more designs alternatives.

In the present context, larger module and pack section assemblies are made up of one or more cells joined in series, parallel or both, and may include additional structure to ensure proper installation and operation of these calls. Although the term "battery pack" is used herein to discuss a substantially complete battery assembly for use in propulsive power applications, it will be understood by those skilled in the art that related terms—such as "battery unit," "battery section," or the like—may also be used to describe such an assembly, and that either term may be used interchangeably without a loss in such understanding.

Figure 1:
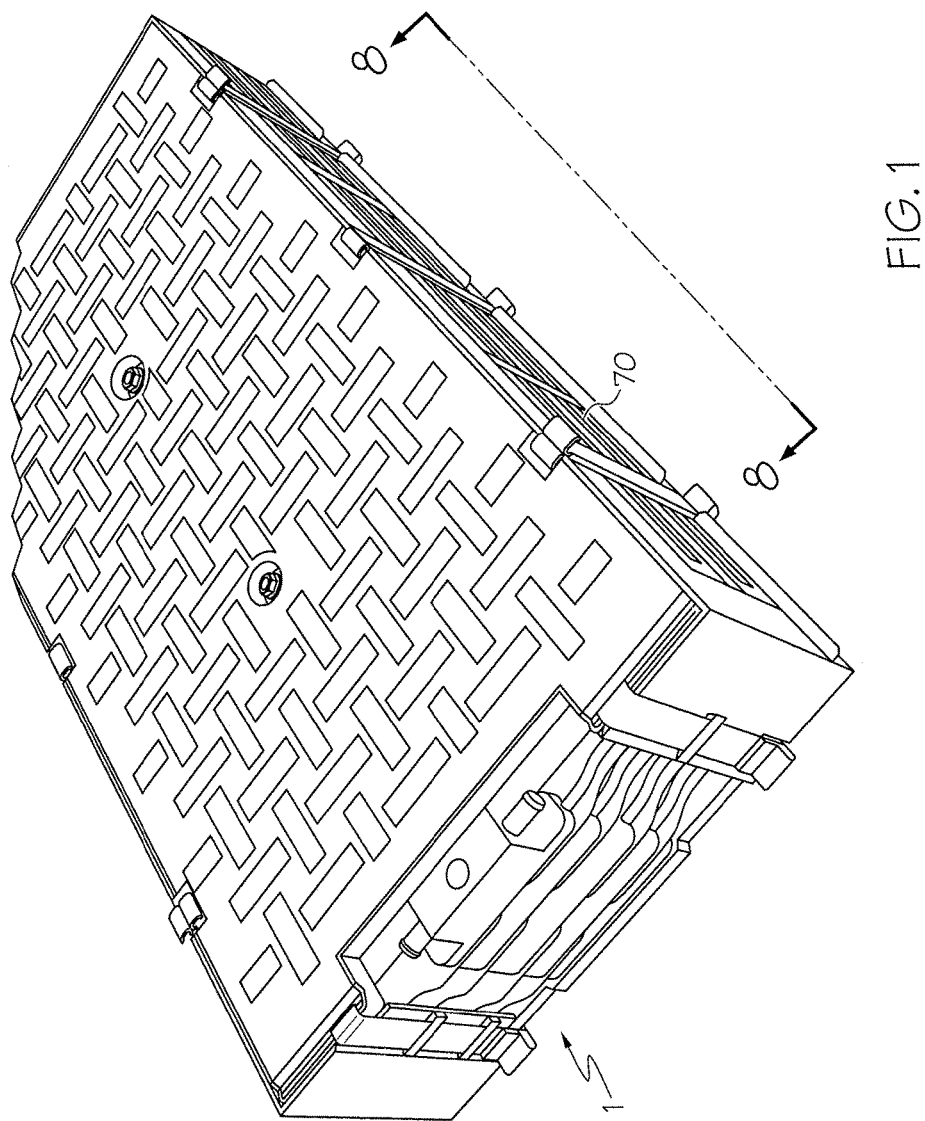
FIG. 1 is an illustration of a battery section to which the present invention may apply according to one embodiment of the present invention.

Referring first to FIG. 1, a battery section 1 is shown according to one embodiment of the present invention. The battery section 1 is of the type commonly used in hybrid or electric vehicles. The prismatic battery section 1 of the present invention utilizes the flat, compact battery cells (also referred to as prismatic pouch battery cells) as shown. This allows for improved deigns through efficient stacking of the cells. Each prismatic cell contains a plurality of electrode sheets within outer shell. Cell tabs extend from the electrode sheets and out of the battery cells to an area where they can be connected to a conductor. In one embodiment, as shown, the positive and negative cell tabs 70 extend horizontally from the same edges of their respective cells; this is repeated for each of the numerous cells that make up the battery section 1 in order to be connected to a bus bar. Traditionally, the cell tabs 70 have sufficient space between them to provide a bonding tool access to both substantially planar portions of the cell tabs 70. The design implemented for an one-sided laser welding process is also applicable for the present invention, as access to only one side is necessary.

A prismatic lithium-ion battery pouch cell (or pouch battery cell) incorporates positive and negative terminals (or cell tabs) 70 projecting out of its edge and is placed within a notional battery section 1. Placed within the battery section 1, the cell tabs 70 align cooperatively to facilitate bonding to a bus bar.

Figure 2:
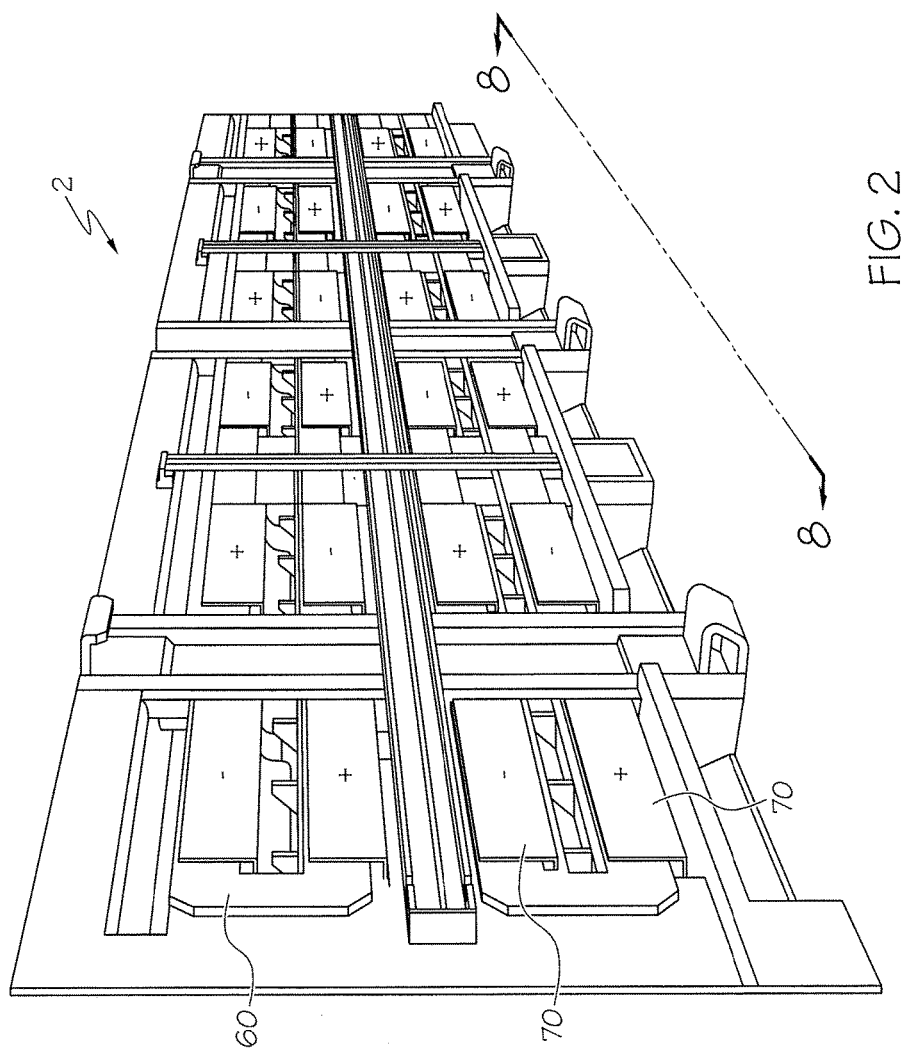
FIG. 2 is a perspective view of a representative cell tab bank of a battery section to which the present invention may apply according to one embodiment of the present invention.

Referring next to FIG. 2, a cell tab bank 2 of a battery section 1 shown from perspective 8 of FIG. 1 according to another embodiment of the present invention is shown. Here, both positive and negative cell tabs 70 are extending out of the battery pouch cell and onto the side of the bank 2, or that all of the cell tabs 70 could be located on only one side of the bank 2. The cell tabs 70 are in contact with the bus bar 60, allowing the electricity generated by the battery cells can be utilized by the larger system. However, the present invention can be utilized with this space-saving configuration, as only access to one side of the cell tab-bus bar assembly is needed and no separate backstop is required.

Figure 3:
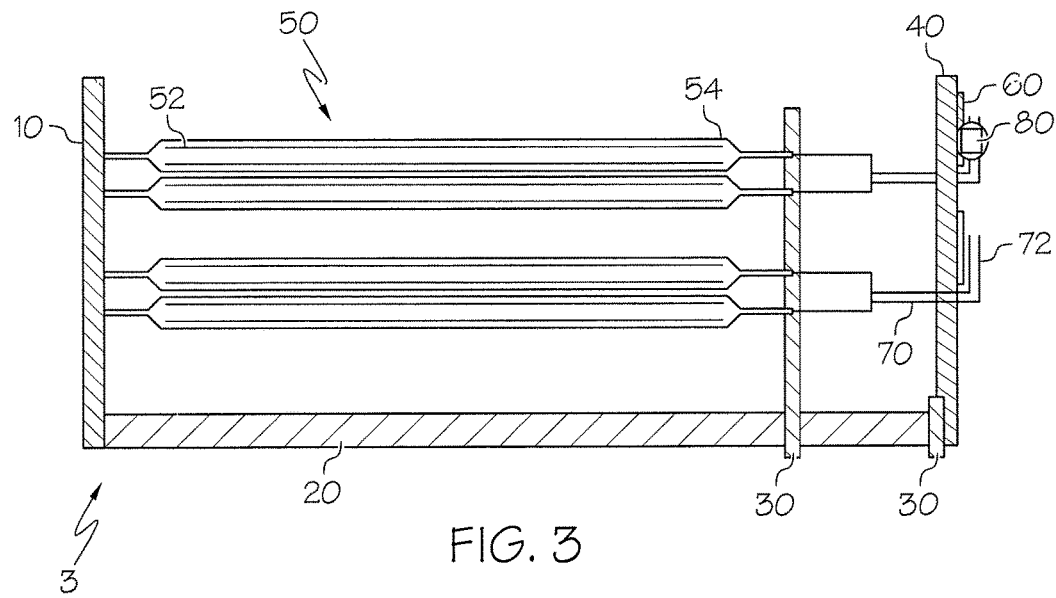
FIG. 3 is a cross-sectional illustration of a battery module showing the details of how battery cell tabs and a bus bar are joined according to one embodiment of the present invention.

Referring now to FIG. 3, a cross-section of a battery pack segment 3 according to another embodiment of the present invention is shown. It would be obvious to one skilled in the art that the segment 3 is part of a larger assembly, such as cell tab bank 2. According to one embodiment, the segment 3 includes an outer frame, including a rear wall 10, end plate 20, interconnect board 40, and edge guides 30. The rear wall 10 and end plate 20 serve a primary purpose of providing structure to the segment 3 and protecting the battery cells 50 from damage. The interconnect board 40 may provide structure to the segment 3, but also serves to provide electrical connections between the battery cells 50. The edge guides 30 may enhance the structural rigidity of the segment 3, but also serve to ensure the other elements of the segment 3 are cooperatively aligned properly within the battery section 1. The electrode sheets 52 and the electrolytes are contained within an exterior battery cell container 54, which provides structure and protection for the battery cell 50.

Additionally, the edge guides 30 can be used to ensure the cell tabs 70 are aligned with each other and the bus bar 60. The bus bar 60 provides the electrical connectivity between the cell tabs 70 and the interconnect board 40. The bus bar 60 is typically substantially thicker than the individual cell tabs 70 to allow for greater electrical loads and to provide structural support for the cell tabs 70. To create the electrical connection between the cell tabs 70 and the bus bar 60, the parts must be joined while maintaining conductivity. In one embodiment of the present invention, it is contemplated that the portion of the cell tabs 70 opposite the battery cell 50, or the cell tab free end 72, is joined to the bus bar 60 through a bond 80 or series of bonds 80. In another embodiment of the present invention, it is contemplated that the cell tabs 70 and the cell tab free ends 72 would be substantially aligned when being joined to the bus bar 60. The alignment of the cell tab free ends 72 ensures the quality of the weld and maximum conductivity. The cell tab free ends 72 may be aligned such that each edge of the cell tabs 70 are substantially parallel. As is shown in the illustration of FIG. 3, some embodiments of cell tab bank 2 are designed with the use of laser welding in mind, and therefore do not allow room for the traditional ultrasonic metal welding which requires horn and anvil assemblies. In circumstances where laser welding is not preferred or possible, the present invention can be used.

Figure 4:
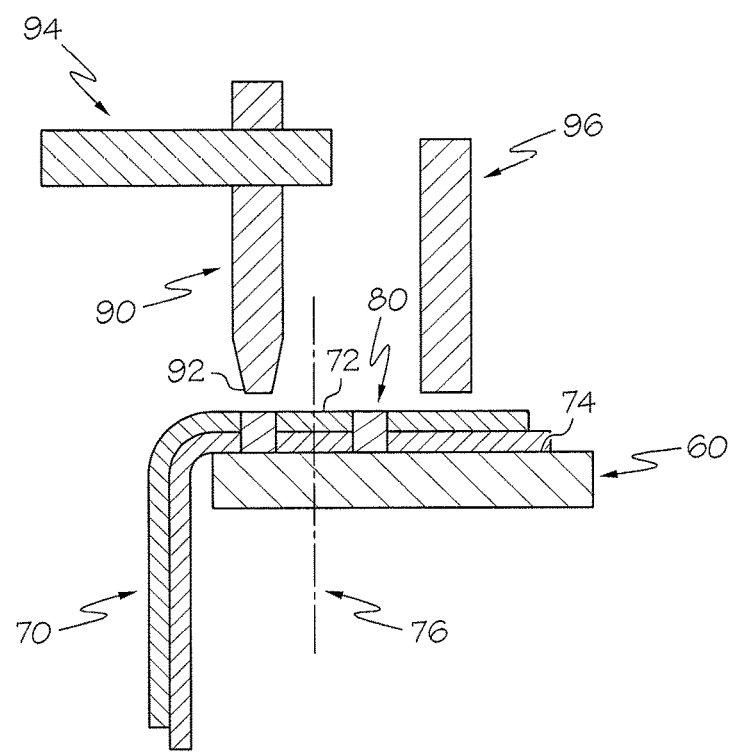
FIG. 4 is an illustration of one embodiment of a method of joining battery cells to a bus bar according to the present invention.

Referring now to FIG. 4, a method of joining cell tabs 70 to a bus bar 60 is shown. According to one embodiment of the present invention, the cell tab free ends 72 are aligned along a stacking dimension 76 within the battery section 1. The cell tabs 70 and bus bar 60 meet at a joining surface 74 through which they can be welded. The bonding tool 90 is also shown, which contacts one side of the cell tabs 70. The ultrasonic transducer 94 generates a frequency that is transmitted to the bonding tool 90. In one embodiment, the bonding tool 90 is contemplated to be mechanically connected to the ultrasonic transducer 94. The bonds 80 are shown as connections between the cell tab free ends 72 and the bus bar 60 that are ultrasonically bonded through the layers. The bond 80 is completed with force substantially less than that used in traditional ultrasonic metal welding, and without access to a second side of the bus bar-cell tabs assembly.

One method of ultrasonically bonding the cell tabs 70 and bus bar 60 includes first arranging the plurality of prismatic battery cells 50 so the cell tabs 70 are substantially aligned along a stacking dimension 76. The stacking dimension 76 is within the battery section 1 and may be aligned along the same dimension as the battery cells 50. The cell tabs 70 may also extend from a lateral edge of the battery cells 50. After the battery cells 50 are arranged and the cell tabs 70 are aligned, one free end of a cell tab 70 is positioned in contact with the surface of the bus bar 60. This cell tab free end 72 may be located at end of the cell tab 70 opposite the battery cell 50. It is also contemplated that the free end would be somewhere along the intermediate length of the cell tab 70. While the cell tab free end 72 is in contact with the bus bar 60, a bonding tool 90 is placed in contact with a surface of the cell tab free end 72. In most typical joining methods, access would be needed to at least two surfaces, such as one surface of a cell tab free end 72 and the bus bar 60. This was to allow for the large force that was used to join the materials. Using the ultrasonic bonding method described herein, without the use of a ribbon or wire bonding agent, allows for the use of small forces to bond the cell tabs 70 to the bus bar 60. The bus bar 60 is ultrasonically bonded to the cell tab free end 72 with the bonding tool 90. In one embodiment, the bonding tool 90 is contemplated to be the same or similar to the tool used in ribbon or wire bonding methods. These tools do not require the high forces of traditional ultrasonic metal welding methods, and only require access to one side of the bus bar 60 and cell tabs 70, not needing the anvil of typical methods.

The bonding tool 90 used is contemplated to have several different iterations based on the number of cell tabs 70 and materials and sizes of the cell tabs 70 and bus bar 60, along with other considerations. The bonding tool 90 could operate at frequencies of about 50,000 Hz to about 90,000 Hz. This is substantially higher than the frequencies used by traditional ultrasonic metal welding methods for joining cell tabs 70 and bus bars 60, which usually operate about 20,000 Hz. Additionally, the force used by this method is substantially less than those of traditional ultrasonic metal welding methods, and the primary reason a backstop is not required during the welding. It is contemplated that the force the bonding tool 90 applies to the surface of the cell tab 70 may be up to about 100 Newtons.

It is also contemplated that in some embodiments, before the cell tabs 70 and bus bar 60 are welded, a securing means 96 may be applied to the same side as the bonding tool 90. The securing means 96 may be any tool or implement that will prevent movement of the cell tabs 70 or the bus bar 60 while the bonding is performed. The securing means 96 may be applied after the cell tabs 70 are placed against the bus bar 60, and may be positioned before the bonding tool 90 contacts the surface of the cell tab 70. The securing means 96 does not apply a force greater than that which would require a backstop, even when combined with the force exerted by the bonding tool 90. In some embodiments, the securing means 96 may extend around all of or a portion of the outer edge of the cell tabs 70 on the same side as the bonding tool 90 is applied. The center of the securing means 96 may be partially void to allow the bonding tool 90 to be applied directly to the cell tabs 70.

It is also expected that cell tabs 70 and the bus bar 60 may be selected from several materials. It is contemplated that they may be made from of a material independently selected from aluminum, aluminum alloys, copper, copper alloys, nickel-plated copper, or nickel-plated copper alloys, or other materials with similar properties. It would be understood by those skilled in the art that any material could be chosen that is typically used to manufacture cell tabs 70 and bus bars 60.

The bonds 80 created by the method of the present invention are known to have limited holding strength. While these bonds 80 may have been suitable for the applications generally used for ribbon or wire bonding, it is contemplated that some applications of battery sections 1 may require a more robust connection. Therefore, the bus bar 60 and cell tab free ends 72 may be ultrasonically bonded multiple times, or until the bond strength is great enough to withstand the expected loads. The bonds 80 may be placed on the cell tabs 70 in order to take advantage of the limited surface area or to maximize the strength of the bonds 80. It is also contemplated that the bonding tool 90 would be placed in direct contact with the free end of at least one of the plurality of cell tabs 70 to perform the ultrasonic bonding. Placing the bonding tool 90 in contact with the cell tab 70 is contemplated to allow the method to create the strongest bonds possible between the cell tabs 70 and bus bar 60. The cell tabs 70 are generally significantly thinner than the bus bar 60, and therefore the ultrasonic bonding tool 90 would be more effective contacting the cell tabs 70 than the bus bar 60.

The steps of positioning the cell tab free ends 72, contacting the bonding tool 90 to the cell tab free ends 72, and ultrasonically bonding are contemplated to involve certain reiterations involving certain combinations of the cell tabs 70. The first embodiment includes consecutively performing the steps for each of the cell tab free ends 72, until all of them are ultrasonically welded to the bus bar 60. Bonding each of the cell tabs 70 individually ensures they are securely connected, although this would extend the amount of time that is needed to join the parts. Another embodiment includes performing the steps once to ultrasonically bond 80 the plurality of cell tabs 70 as a whole to a bus bar 60. This method increases the speed at which the process can be completed, but limits the number of bonds 80 that can be completed in total. Yet another embodiment includes consecutively performing the steps for more than one but less than all of the cell tabs 70 until all of them are ultrasonically welded to the bus bar 60. This embodiment allows for a customizable process to allow for a more intelligent application of the ultrasonic bond 80. It is also contemplated that the bonding step may be repeated as often as necessary to achieve the required bond strength. These steps are performed without the use of an external backstop, as the force applied to the cell tabs 70 does not require the use of one. It is contemplated that in some embodiments an integrated backstop may be utilized.

According to another embodiment of the present invention, a method of bonding a plurality of prismatic battery cells 50 and a bus bar 60 within a battery section 1 is disclosed. The method includes placing the battery cells 50 in a battery section 1 so that a number of them are aligned in a certain direction. The cell tabs 70 are also substantially aligned along a plane within the battery section 1. As part of the process a bonding tool 90 is provided, that operates with one-sided bonding. The bonding tool 90 also has a bonding tip 92 and a means for applying an ultrasonic excitation, which is provided by the ultrasonic transducer 94. One skilled in the art will appreciate that the bonding tip 92 may be any tip that is typically used with ribbon bonding, wire bonding, or other ultrasonic bonding means that would be applicable to the present invention. One skilled in the art will appreciate that the ultrasonic transducer 94 may be any means that is typically used to generate an ultrasonic frequency for bonding. The free end of at least one of the plurality of cell tabs 70 is put in contact with a surface of the bus bar 60. It is contemplated that in one embodiment the cell tab free ends 72 will be stacked vertically above the bus bar 60, to present a uniform array of cell tabs 70 to allow for a more effective bond 80. The bonding tool 90 contacts the surface of the cell tab free end 72. An ultrasonic excitation is applied with the bonding tip 92 of the bonding tool 90. This excitation forms an ultrasonic bond 80 between the positioned bus bar 60 and the cell tab free end 72. This bond 80 also creates and facilitates the electrical connectivity between the cell tabs 70 and the bus bar 60.

Figure 5:
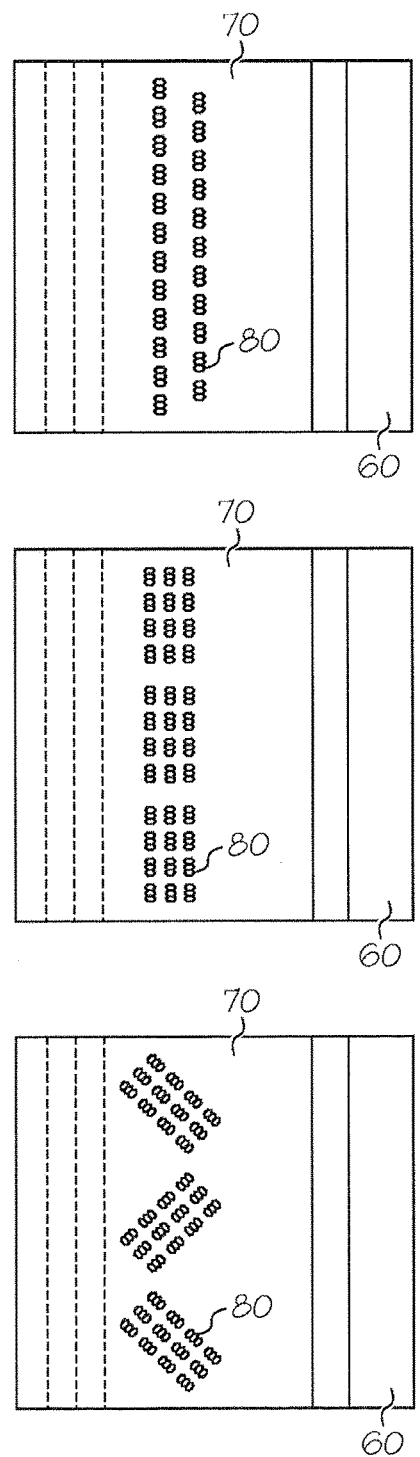
FIG. 5 is an illustration of representative top views of the bus bar joined to cell tab of FIG. 4 populated with miniature welds in several configurations according to the present invention.

Referring now to FIG. 5, several embodiments of cell tabs 70 bonded to bus bars 60 are shown. The embodiments are shown from the top view of FIG. 4, excluding the ultrasonic transducer 94, the bonding tool 90, and the securing means 96. The dashed lines represent the edges of the elements underneath the top cell tab 70. As illustrated, the bonds 80 can be populated to increase the bonding strength of the unit. The bonds 80 may be arranged in certain patterns or arrangements to increase the bonding strength, increase the number of bonds 80 that can fit on the cell tabs 70 or bus bar 60, or meet other requirements. It is also contemplated that the size of the bonds 80 may be varied between the populated bonds 80, to allow further flexibility in the design.

According to the present invention, a battery section 1 is also contemplated containing a plurality of prismatic battery cells 50. The battery cells 50 have a plurality of cell tabs 70 that extend from a lateral edge defined by the arranged battery cells 50. These cell tabs 70 are substantially aligned along a stacking dimension 76 that is defined within the battery section 1. This stacking dimension 76 may be along the same dimension as the battery cells 50 are aligned. Additionally, a free end of at least one of the plurality of cell tabs 70 is positioned in contact with a surface of a bus bar 60. Here, the cell tabs 70 may be stacked on each other, so that the free end of one of the cell tabs 70 is on the surface of the bus bar 60, while the others are stacked on top of the one cell tab 70. Furthermore, the bus bar 60 and the cell tabs 70 are bonded ultrasonically. This ultrasonic bond 80 is not contemplated to be a laser weld, or to have a bonding agent to facilitate the bond 80, such as solder, and therefore is stated as only an ultrasonic bond 80.

The specific bus bars 60 and cell tabs 70 for each possible battery section 1 will determine some of the parameters that will be used when the battery section 1 of the present invention is completed. In one embodiment, it is contemplated that the width of the ultrasonic bond 80 is up to between about 2 mm to 3 mm. This width could depend upon the thickness of the materials and the number of bond 80, as well as other significant factors. It is also contemplated that the bus bar 60 may vary in size, as several different bus bars 60 are used for prismatic battery pack sections 1. The thickness of the bus bar 60 may range from about 0.6 mm to about 1.0 mm. Additionally, the ratio of the thickness of the bus bar 60 to the thickness of each cell tab 70 may be at least about 2:1. It is also contemplated that the cell tabs 70 and the bus bar 60 are made of a material independently selected from aluminum, aluminum alloys, copper, copper alloys, nickel-plated copper, or nickel-plated copper alloys, or other materials with similar properties.

In another embodiment, the battery section 1 of the present invention may include numerous ultrasonic bonds 80 that join the cell tabs 70 to the bus bar 60. The strength of the bond 80 between the cell tabs 70 and the bus bar 60 would be maximized by utilizing multiple bonds 80. It is expected that the bus bar 60 would be robust enough to be able to withstand the force applied by the bonding tool 90 during the contact and the bonding steps of the process. This is necessary because the bonding tool 90 does not include an anvil. It is also contemplated embodiments which utilize a securing means 96, the bus bar 60 will be able to withstand the force applied by the bonding tool 90 and the securing means 96, without an external backstop, or with an integrated backstop. One skilled in the art will appreciate that any type of bus bar 60 that is generally used for prismatic battery section 1 may be used with the present invention. In one embodiment, the side of the bus bar 60 or cell tabs 70 opposite the bonding tool 90 may rest on a supporting structure, or another part of the battery section 1 to withstand any load resulting from the bonding tool 90. In yet another embodiment, the bus bar 60 or battery section 1 section behind the bus bar 60 may include an integrated backstop. While the ultrasonic bonding method of the present invention does not require access to a second side of the cell tabs 70 or the bus bar 60, the bus bar 60 may have an integrated backstop or a reinforced member. The backstop may allow for a higher force to be applied by the bonding tool 90 to the cell tabs 70 and the bus bar 60. The backstop is also possible because of the ability to alter the design of the battery section 1, as access is only needed to one side of the bus bar 60 or cell tabs 70. Additionally, the ultrasonic bonds 80 are not created using a laser weld, which does not utilize a tool that contacts the surface of the cell tabs 70.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of ultrasonically bonding a plurality of prismatic battery cells to a bus bar within a battery section, the method comprising:
   arranging the plurality of prismatic battery cells such that a plurality of cell tabs that extend from a lateral edge defined by the arranged battery cells are substantially aligned along a stacking dimension defined within the battery section;
   positioning a free end of at least one of the plurality of cell tabs in contact with a surface of the bus bar;
   contacting a bonding tool to no more than one surface of the positioned cell tab free end;
   contacting a securing means to the surface to be contacted by the bonding tool prior to contacting the bonding tool to the surface; and
   ultrasonically bonding the positioned bus bar and the cell tab free end with the bonding tool.

2. The method of claim 1, wherein the bonding tool operates at a frequency of about at 50,000 Hz to about 90,000 Hz.

3. The method of claim 1, wherein the bonding tool applies a force up to about 100 Newtons.

4. The method of claim 1, wherein the plurality of cell tabs and the bus bar are made of a material independently selected from aluminum, aluminum alloys, copper, copper alloys, nickel-plated copper, or nickel-plated copper alloys.

5. The method of claim 1, further comprising repeating the ultrasonic bonding a plurality of times on the bus bar and cell tab free end in cooperative alignment.

6. The method of claim 1, wherein the bonding tool is placed into direct contact with the free end of at least one of the plurality of cell tabs in order to perform the ultrasonic bonding.

7. The method of claim 1, wherein the ultrasonic bonding is performed without laser welding.

8. The method of claim 1, wherein the steps of positioning, contacting, and ultrasonically bonding further comprises consecutively performing the steps for each of the cell tab free ends until the plurality of cell tabs are ultrasonically bonded to the bus bar.

9. The method of claim 1, wherein the steps of positioning, contacting, and ultrasonically bonding further comprises performing the steps once to ultrasonically bond the plurality of cell tabs as a whole to the bus bar.

10. The method of claim 1, wherein the steps of positioning, contacting, and ultrasonically bonding further comprises consecutively performing the steps for more than one but less than all of the cell tab free ends until the plurality of cell tabs are ultrasonically bonded to the bus bar.

11. A method of joining a plurality of prismatic battery cells within a battery section, the method comprising:
   positioning a plurality of cell tabs that define electrical connections with their respective battery cells such that the cell tabs are aligned along a stacking dimension defined within the battery section;
   positioning the plurality of cell tabs such that at least one of them is in contact with a surface of a bus bar;
   providing a bonding tool for one-sided operation having a bonding tip cooperative with an ultrasonic excitation source;
   contacting a securing mechanism to no more than one surface of the positioned bus bar and the cell tab;
   contacting, after contacting the securing mechanism, the bonding tip of the bonding tool to the no more than one surface of the positioned bus bar and the cell tab; and
   applying the ultrasonic excitation with the bonding tip of the bonding tool to form an ultrasonic bond between the bus bar and the cell tab.

12. The method of claim 11, wherein a width of the ultrasonic bond is up to about 2 mm and a length is up to about 3 mm.

13. The method of claim 11, wherein a thickness of the bus bar is between about 0.6 mm to about 1.0 mm.

14. The method of claim 11, wherein the plurality of cell tabs and the bus bar are made of a material independently selected from aluminum, aluminum alloys, copper, copper alloys, nickel-plated copper, or nickel-plated copper alloys.

15. The method of claim 11, further comprising a plurality of ultrasonic bonds that join the plurality of cell tabs to the bus bar.

16. The method of claim 11, wherein a ratio of a thickness of the bus bar to a thickness of each of the plurality of cell tabs is at least about 2:1.

17. The method of claim 11, wherein the bus bar further comprises an integrated backstop.

18. The method of claim 11, wherein the ultrasonic bond is not created using a laser weld.

19. A method of joining a plurality of prismatic battery cells within a battery section, the method comprising:
   positioning a plurality of cell tabs that define electrical connections with their respective battery cells such that the cell tabs are aligned along a stacking dimension defined within the battery section;

positioning the plurality of cell tabs such that at least one of the plurality of cell tabs is in contact with an exposed surface of a bus bar, the exposed surface being disposed opposite an inaccessible surface of the bus bar;

providing a bonding tool for one-sided operation having a bonding tip cooperative with an ultrasonic excitation source;

contacting the bonding tip of the bonding tool to no more than one surface of the positioned bus bar and the cell tab without contacting the bonding tool to the inaccessible surface of the bus bar;

contacting a securing means to the surface to be contacted by the bonding tool prior to contacting the bonding tool to the surface; and applying the ultrasonic excitation with the bonding tip of the bonding tool to form an ultrasonic bond between the bus bar and the cell tab.

* * * * *